Patented Dec. 13, 1938

2,140,062

UNITED STATES PATENT OFFICE 2,140,062

MANUFACTURE OF RUBBER PRODUCTS, MORE PARTICULARLY OF POROUS AND SPONGY MASSES AND ARTICLES

Josef Anton Talalay, Bedford, England

No Drawing. Application March 9, 1936, Serial No. 67,990. In Great Britain March 14, 1935

6 Claims. (Cl. 18—53)

This invention relates to the production of rubber or similar goods more particularly of porous and spongy masses and articles.

Several methods have already been proposed for making spongy and porous rubber masses and articles. Thus it is known to whip up aqueous rubber dispersions or rubber solutions to form a compact foam which is then set before or after running into shapes. It is also old to incorporate with the rubber mix a pore-forming agent, e. g. salts like ammonium carbonâte, which more particularly under the action of heat will irreversibly decompose to yield a gaseous product whereby gas-filled pores are formed in the mix, and the latter acquires a spongy texture.

These known processes possess several disadvantages, the most important of which are the slight control, or even complete lack of control, over the pore size produced and furthermore the comparatively slow formation of the froth.

The object of this invention is to provide a process more particularly for making porous and spongy masses and articles which is superior to the processes heretofore proposed and which more particularly provides a complete control over the pore size of the product and enables a porous substance to be produced which is of more uniform texture than the products heretofore known and which may be very much lighter, or less dense, than the latter, these desirable advantages being secured independently of the size of the article.

According to this invention the pores are formed by subjecting the material to which the spongy structure is to be imparted to a pressure which is less than that of the atmosphere, whereby any dissolved or entrained gases such as air (and/or other gases) in the material expands and forms pores. This action may be enhanced, if desired, by introducing gas into the material before the pressure-reducing treatment. If the degree of vacuum is sufficiently high, water (or other liquid) present in the material may also vaporize and contribute to the formation of pores.

It will be seen that by the precise control of the degree of vacuum, and the preliminary adjustment (if necessary) of the content of pore-forming substances in the material, the whole process is placed under strict supervision and the texture of the resulting sponge as well as the pore size thereof can be controlled as desired.

Although the invention relates more particularly to the making of sponge or porous rubber products it is to be distinctly understood that it is not limited thereto.

Suitable material for use in the process comprises rubber solutions in organic solvents such as petrol, benzine or carbon tetrachloride or natural or artificial dispersions of rubber material of all kinds; the solutions may also be used in admixture with dispersions. Any dispersing medium may be used including water. Examples of suitable rubber material for use in the invention are latex, latex concentrates, caoutchouc dispersions or solutions, gutta percha latex or dispersion, balata latex or dispersion. The latex used may be in the vulcanized or unvulcanized, fresh or preserved state. Other substances which may be used are dispersions of synthetic elastic products, e. g. of Duprene or of Thickol, which latter is a reaction product of ethylene dichloride and sodium tetrasulphide. For the sake of brevity the invention will be described below with reference to a latex mix, but, as explained, the invention is not limited in any way to the use of latex. The mix employed may, of course, contain vulcanizing agents, accelerators, pigments and fillers, antioxidants etc. such as are normally employed in rubber mixes. It may also contain a softening agent such as mineral oil, and any other ingredients usually employed.

It may further be pointed out that there is no limitation as regards the degree of vacuum which can be employed. This may be chosen as desired, and the pore size produced will be controlled by regulating the degree of vacuum. Further, it may sometimes be found desirable to raise the temperature during the pore-forming operation, preferably to a degree below the vulcanizing temperature and the invention therefore also comprises processes in which the temperature is raised either before, during or after the subjection of the latex to diminished pressure.

In one form of the process the latex mix, after addition thereto of a setting agent (i. e. an agent which promotes gellation, either in the hot or in the cold), such as sodium silico-fluoride or sodium nitrate, is introduced into a container, whereupon the pressure of the air in the latter is reduced, and at the same time, if desired, the mix is warmed. The mix will be found to swell up or expand in the container, due to expansion of the air contained in the mix, and under certain conditions due also (according to the degree of vacuum employed) to evaporation of water contained therein. It will be obvious that this froth is not stable, in that if the pressure inside the container is restored to that of the atmosphere the latex froth will collapse again. In this form of the invention, therefore, it is essential to allow the mix to set (gel) in the container under the reduced pressure, wherefor a setting agent (e. g. electrolytes, preferably salts of a bi- or tri-valent metal) is previously added. When the product has set the pressure is released and the product vulcanized and dried. The vulcanization and drying is preferably effected simultaneously by passing hot air or other indifferent gas through the apparatus containing the porous product. The air or gas is preferably passed through the apparatus under reduced pressure, as thereby the water is more readily evaporated and better drying is effected.

If it is desired to enhance the effect in this process the latex or other suspension employed may be whipped so as to give it an opportunity of acquiring additional quantities of air. Alternatively a gas may be previously passed through the latex, or mechanical treatment may be adopted which will enable the latex or the mix to take up air or other indifferent gas. A volatile liquid may also be added to the latex mix for the same purpose, e. g. petrol or other volatile solvents and/or oils. This will wholly or partly vaporize under the reduced pressure (and under the influence of heat if this is used) and the vapour will expand and contribute to the formation of pores. The amount of volatile liquid added for this purpose, or whether any such liquid is to be added at all will depend upon the type of porous product in view.

It will be clear that in the particular mode of procedure described the instability of the froth and its immediate collapse when exposed to atmospheric pressure preclude any possibility of pouring the froth into moulds for it to set therein and form shaped articles. It will be necessary to take steps to ensure that the froth does not collapse when the atmospheric pressure is restored in the frothing container, and further it will be necessary to add a froth stabilizer so that the froth will not disintegrate away during the pouring operation. When it is desired to pour the froth into shapes, therefore, a slightly modified procedure must be adopted.

In order to prevent the froth collapsing when the vacuum is released it is necessary for the internal pressure of the pores to be substantially the same as, or greater than, atmospheric pressure. This is done by adding to the latex or mix a substance which under the conditions of the process (e. g. under sub-atmospheric pressure and may be at elevated temperature) undergoes an irreversible preferably chemical change with evolution of gas, which changes the empty cells of the porous product into gas-filled cells. The products is allowed to rise, e. g. until the container is full, and the container opened when the pressure developed therein is substantially equal to or greater than that of the atmosphere. The resulting froth with gas-filled cells is stable at ordinary pressure, and characterized by astonishing uniformity and lightness. If desired, this production of gas-filled pores may be accompanied by a coagulation process or a gelling operation so that the froth is converted into a sponge.

A large variety of substances is available for addition to the latex or mix in this form of the invention. As examples may be mentioned ammonium carbonate, hydrogen peroxide or ammonium nitrite. The ammonium nitrite may be added as such or may be produced in situ in the mix by interaction of added ammonium sulphate and sodium nitrite. Any salts added to the mix may be added in the form of solution.

A similar result will be obtained by previously saturating the mix under pressure with a gas. It is not even necessary to saturate the mix. It is quite sufficient to add liquefied gas (e. g. carbon dioxide) or solidified gas (carbon dioxide snow) to the mix; the whole may be mixed up together if desired, but this is not necessary. Again, gases can be added in the adsorbed form, e. g. adsorbed in charcoal, or other active surfaces or fillers. A volatile liquid can also be employed in an adsorbed form for the purpose.

In carrying out this modified form of the invention, the product may be allowed to set in the container, either under reduced pressure or not. If the product is to be poured into moulds a stabilizing agent must be present; a suitable such agent is saponin, but other froth stabilizers may be employed. A setting agent may be added before or after the subjection of the mix to reduced pressure; it is advisable to choose a setting agent which does not produce too rapid setting. The set product may be vulcanized in any known way, advantageously under reduced pressure. For example the Peachey process may be employed, or the product, containing vulcanizing agent, may be treated with hot air, e. g. under reduced pressure.

A suitable mix for use in this form of the process is given in the following example (parts are all by weight):

Example I

| | Parts |
|---|---|
| Latex (referred to dry rubber) | 100 |
| Zinc oxide | 5 |
| Sulphur | 2.5 |
| Accelerator | 0.5 |
| Antioxidant | 1 |
| Mineral oil | 10 |
| Saponin | 1 |
| Petrol | 10 |
| Ammonium carbonate | 5 |

The petrol and ammonium carbonate act simultaneously as setting agent and if required an additional setting agent may be added in the form of e. g. 1 to 2 per cent sodium silico-fluoride. A suitable accelerator is pentamethylene-piperidine dithiocarbamate.

In order to ensure uniform porosity it may be necessary in some cases to rotate the container during the setting period.

The sub-atmospheric pressure can be produced by any suitable type of vacuum pump.

Example II

| | Part by weight |
|---|---|
| Latex (referred to dry rubber) | 100 |
| Zinc oxide | 5 |
| Sulphur | 2.5 |
| Accelerator | 0.5 |
| Antioxidant | 1.0 |
| Mineral oil | 10 |
| Saponin | 1 |
| Petrol | 10 |
| Hydrogen peroxide (100 vol.) concentrated | 2 to 5 |
| Sodium silico-fluoride | 2 |

30 min. pressure.

Stabilization of the pores can also be effected with simultaneous coagulation in the process according to invention by allowing the froth of gas-containing spaces to set under diminished pressure. It has been found that in these circumstances the individual cells intercommunicate to a very considerable extent and air having slow access to the container can fill up the large pores produced.

In any of the forms of the process hereinbefore set forth a start may be advantageously made with starting material which has been preliminarily worked up to a slight froth, such as is formed by whipping, beating, mixing with organic solvents etc. and allowed stand.

A very valuable product is obtained by incorporating fibrous material with the porous and spongy product provided by the invention. The fibrous material may be of any kind whatsoever, vegetable, animal or mineral, artificial or natural. Examples are hair, coconut fibre, (sawdust) and asbestos. The hardness of the product will depend upon the relative proportions of the porous material and the fibrous material. The product can be made very hard by incorporating a large proportion of fibres. On the other hand a product may be obtained which is highly resilient, particularly when rubberized hair is employed, as the fibres seem to form supports for skins of rubber (or other material being employed), which skins can enclose large pores. The fibrous material is advantageously incorporated by placing it in a container and allowing the porous material to rise up over it under the influence of the subatmospheric pressure.

The invention hereinbefore described may be modified in detail without departing from the spirit and scope of the same, and such modifications will readily occur to those skilled in the art. It is to be distinctly understood, in this connection, that the invention is in no way limited to the specific forms of procedure hereinbefore described.

In the appended claims the words "froth" and "foam" and derivatives thereof, in the instances in which they are used, are to be understood as relating only to a mass wherein, during such time as it is cellular as distinguished from reticulated, the resistance to expansion of the cells is primarily that of surface tension rather than that of simple resistance to deformation.

In the appended claims the words "a substance having the pertinent characteristics of rubber" are to be understood as meaning a substance having all of the following characteristics: that it can be in the form of an aqueous dispersion; that the dispersion can be initially frothed into a foam by reduction of pressure; that the foam so produced can be irreversibly set in its expanded form; and that when set it will have an elasticity and resilience similar to that of vulcanized natural rubber.

What I claim is:

1. A method of producing sponged material of substantially uniform pore size which comprises subjecting to reduction of pressure an unfrothed aqueous dispersion of a substance having the pertinent characteristics of rubber and having the capability of being frothed under reduced pressure, and thereby causing it to expand by foaming, and then causing the said substance to set permanently in its expanded condition.

2. A method of producing sponged material of substantially uniform pore size which comprises subjecting to sub-atmospheric pressure an unfrothed aqueous dispersion of a substance having the pertinent characteristics of rubber and thereby causing it to expand by foaming and causing the said substance to set permanently in its expanded condition.

3. A method of producing sponged material which comprises subjecting to a reduction of pressure an unfrothed aqueous dispersion of a substance having the pertinent characteristics of rubber and having the capability of being frothed under reduced pressure, and thereby causing it to expand by foaming and causing the said substance to set permanently in its expanded condition, and raising the temperature of the dispersion during at least a part of the process.

4. A method of producing sponged material which comprises subjecting to reduction of pressure an aqueous dispersion of a substance having the pertinent characteristics of rubber and having therein an added substance capable of producing a gas dispersed in the dispersion, and by such subjection of the dispersion to reduction of pressure causing the added substance to provide a gas and thus causing the dispersion to expand by foaming, and causing the first said substance to set permanently in its expanded condition.

5. A method of producing sponged material which comprises associating in a container a reticulated mass of fibrous material and a substance having the pertinent characteristics of rubber and having the capability of being frothed under reduced pressure, subjecting said substance to reduction of pressure and thereby causing it to expand by foaming and thereby extend itself through the interstices of the said mass, and then causing the said substance to set permanently in its expanded condition.

6. A method of producing sponged material which comprises associating in a container fibrous material and a substance having the pertinent characteristics of rubber and having the capability of being frothed under reduced pressure, subjecting said substance to reduction of pressure and thereby causing it to expand by foaming, and then causing the said substance to set permanently in its expanded condition, to produce a porous article of said fibers and said substance.

JOSEF ANTON TALALAY.